US000001358H

United States Statutory Invention Registration [19]

[11] Reg. Number: H1358

Ferrando et al.

[43] Published: Sep. 6, 1994

[54] DIAMOND/SILVER COMPOSITES

[75] Inventors: William A. Ferrando, Arlington, Va.; James B. Clark, Ellicott City, Md.

[73] Assignee: The United States of America as represented by the Secretary of the Navy, Washington, D.C.

[21] Appl. No.: 105,324

[22] Filed: Aug. 6, 1993

[51] Int. Cl.[5] ..... B32B 7/00

[52] U.S. Cl. ..... 427/217; 427/226; 264/109; 264/123; 264/128; 264/134

[58] Field of Search ..... 427/217, 226; 264/109, 264/123, 128, 129, 134; 51/295

[56] References Cited

U.S. PATENT DOCUMENTS

| | | | |
|---|---|---|---|
| 4,988,673 | 1/1991 | Ferrando | 427/62 |
| 5,011,514 | 4/1991 | Cho et al. | 51/295 |
| 5,120,495 | 6/1992 | Supan et al. | 419/11 |

*Primary Examiner*—Donald P. Walsh
*Assistant Examiner*—Anthony R. Chi
*Attorney, Agent, or Firm*—Jacob Shuster; Roger D. Johnson

[57] ABSTRACT

A process for preparing a diamond particle/silver metal matrix composite structure by coating diamond particles with molten silver nitrate, decomposing the silver nitrate to form a silver metal coating on the surfaces of the diamond particles, consolidating the silver metal coated diamond particles into a composite structure having continuous pores between the silver metal coated diamond particles, infiltrating the continuous pores of the composite with molten silver nitrate and decomposing the silver nitrate to form silver metal which fills the continuous pores of the composite structure.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIAMOND/SILVER COMPOSITES

BACKGROUND OF THE INVENTION

This invention relates to composites and more particularly to metal/carbon composites having high thermal conductivities.

Up to the present, certain metals and alloys of aluminum and magnesium have been used to fabricate the heat sinks which are employed successfully to carry away the heat generated by solid state electronics. Their high thermal conductivity and low density (aluminum: 2.37 W/cm/K, 2.70 g/cc) provided the necessary combination of physical properties for heat sink cooling of lightweight electronic packages.

The very large scale integration (VLSI) of the most recent generation of electronics has put increased demands on the cooling system. Heat must be conducted rapidly away from ever smaller solid state chips. More efficient heat sinks are needed. It has been proposed, for example, to use continuous graphite fiber/aluminum composites for this purpose. The graphite fiber axial thermal conductivity of 300–500 W/m-K can provide a significant unidirectional performance improvement, provided that the continuous fibers remain undegraded and unbroken. While fiber materials costs are reasonable for applications envisioned, fabrication of continuously reinforced MMCs in complex geometry is difficult.

Accordingly it would be desirable to provide a new material having high heat conductivity and which can be fabricated into complex shapes.

SUMMARY OF THE INVENTION

Accordingly, an object of this invention is to provide new materials having high heat conductivities.

Another object of this invention is to provide a method of fabricating new materials having high heat conductivities into complex shapes.

A further object of this invention is to provide composite structure which will be useful as heat sinks for integrated circuit devices.

These and other objects of this invention are accomplished by providing:

a process for preparing a diamond particle/silver metal matrix composite material object comprising:

A. coating the surfaces of diamond powder particles with molten silver nitrate at a temperature of from just above the melting point of silver nitrate to just below the decomposition temperature of silver nitrate;

B. heating the molten silver nitrate coated diamond particles produced in step A at a temperature from the decomposition temperature of silver nitrate up to 550° C. until the molten silver nitrate decomposes to form a coating of silver metal on the surfaces of the diamond particles;

C. consolidating the silver metal coated particles produced in step B into a composite structure having continuous porous between the silver coated diamond particles;

D. infiltrating the continuous pores of the composite structure produced in step C with molten silver nitrate at a temperature of from just above the melting point of silver nitrate to just below the decomposition temperature of silver nitrate;

E. heating composite structure at a temperature of from the decomposition temperature of silver nitrate to 550° C. until the molten silver nitrate in the pores of the composite structure decomposes to silver metal; and F. repeating steps D and E until the pores of the composite structure are essentially filled with silver metal.

DETAILED DESCRIPTION OF THE PREFERRED EMBODIMENT

A significant improvement in heat conduction properties in composite materials can be achieved by using diamond particulates which recently have become more widely available. Pure diamond type II has a thermal conductivity of about 2000 W/m-K, which, for practical purposes is isotropic. The present invention provides means for fabricating new composites based on diamond particulates which achieve maximum thermal transfer between the diamond particles.

The basic heat sink material is a composite structure of particles of diamond powder which are bonded together by a silver metal matrix. The diamond particles are essentially uniformly distributed through the silver metal matrix. Suitable diamond powders are inexpensive and widely available commercially. They are available as the products of cutting gem stones or may be produced artificially.

The diamond particle/silver metal composites of this invention are prepared by:

(1) coating the diamond particles with silver metal, (2) hot or cold pressing the silver metal coated particles into a preform of the desired shape, and (3) filing the interstices of the preform with silver metal to produce the final composite structure.

The diamond particles are coated with molten silver nitrate which is then decomposed to form the silver metal coating on the diamond particles In one procedure the diamond powder is intimately mixed with silver nitrate powder. The mixture is then heated to a temperature above the melting point of silver nitrate (212° C.) but below the decomposition temperature of silver nitrate (444° C.) until the silver nitrate melts. The mixture is agitated (e.g., stirred) to assure that molten silver nitrate coats all the diamond particles. In a second procedure the silver nitrate is dissolved in a suitable solvent such as water or more preferably ethylene glycol. Saturated silver nitrate solutions are preferably used. The silver nitrate solution is mixed into the diamond powder. The solvent is then removed (e.g., evaporated) causing the silver nitrate to form small crystals on the surfaces of the diamond particles. Care must be taken in removing ethylene glycol because at high temperatures it acts as a fuel and may catch fire. In removing ethylene glycol the temperature should be kept below 75° C. and preferably should be in the range of from 50° C. TO 65° C. The silver nitrate coated diamond particles are then heated to a temperature above the melting point of silver nitrated but below the decomposition point of silver nitrate to form the molten silver nitrate coating on the diamond particles. For both procedures, the next step comprises heating the molten silver nitrate coated diamond particles at a temperature of preferably from the decomposition temperature of silver nitrate to 550° C., more preferably from 450° to 525° C., and still more preferably from 475° C. to 500° C. until the molten silver nitrate decomposes to form a thin silver metal coating.

The silver metal coated diamond powder will preferably comprise from about 10 to about 60, more preferably from 15 to 50, and still more preferably from 20 to 40 weight percent of silver metal, with the remainder being the diamond powder. The weight of silver require to produce the desired weight percentage of silver for a given weight of diamond material is first calculated. The amount of silver nitrate needed will be 1.575 times the weight of silver needed.

In example 1, only partial coverage of the diamond particle surfaces was achieved even where more than 50 weight percent of silver metal was produced. The silver beads up. This contrasts with ceramic and metal surfaces where a complete, uniform coating is achieved even with much lower percentages of silver. However, this does not present a problem as the unevenly coated diamond particles work well in the next step of the process.

Next, the silver metal coated diamond powder particles are consolidated into a preform of a desired shape. This may be done by conventional cold pressing, hot pressing, cold isostatic pressing (C.I.P.), or hot isostatic pressing (H.I.P.). The isostatic processes can be used to produce complex shapes. The consolidated preforms are porous with continuous interstices forming tunnels or channels throughout the preform.

In the final step of the process, the continuous interstices are filled with silver metal to produce a strong composite shape. The preform may be submerged in a bath of molten silver nitrate which readily flows into and fills the interstices. Of course, the bath temperature is maintained a temperature in the range of from just above the melting point of silver nitrate to just below the decomposition temperature of silver nitrate. If the preform has not been preheated, it should be kept in the bath until it reaches the temperature of the bath to insure that all the silver nitrate is molten The preform is then removed and heated to a temperature of preferably from the decomposition temperature of silver nitrate to 550° C., more preferably from 450° C. to 525° C., and still more preferably from 475° C. to 500° C. until the molten silver nitrate has decomposed to silver metal. The procedure of molten silver nitrate coating and decomposition steps is repeated until the weight of the diamond particle/silver metal matrix composite becomes constant, indicating that the interstices are essentially filled with silver metal. For objects that are too large to be dipped in a bath, the molten silver nitrate may be applied repeatedly at the surface of the preform using brushes, rollers, etc. The preform should be preheated to a temperature in the range of from just above the melting point of silver nitrate (212° C.) to just below the decomposition temperature to avoid ether freezing or prematurely decomposing the molten silver nitrate. The molten silver nitrate has about the viscosity of water and readily flows into the interstices. Molten silver nitrates flowing out the other side of the preform indicates saturation has been achieved. The preform is then heated to decompose the molten silver nitrate to silver nitrate as described above. An as described above, the procedure is repeated until the weight of the preform becomes constant or unchanging, indicating that the intestices have been essentially filled with silver metal.

Example 3 illustrates a more complex embodiment of this invention in which the basic diamond particle/silver metal matrix is sandwiched between sheets of a light metal which is preferably aluminum or magnesium with aluminum being more preferred. The metal sheets are cleaned, coated with molten silver nitrated, and then heated at a temperature that is preferably from just above the decomposition temperature of silver nitrate to 550° C., more preferably from 450° C. to 525° C., and still more preferably from 475° C. to 500° C. until the silver nitrated decompose to form a thin, uniform coating of silver metal on the metal sheet. A mixture of silver metal coated diamond particles and powdered silver nitrated is placed between two sheets and heated to melt and decompose the silver nitrate to form silver metal to bond the silver metal coated particles together and to the silver coated sheets of metal. The resulting sandwich composite is then consolidated under high temperature and pressure.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Coating diamond particle with silver

This was an attempt to coat the diamond particles with a thin Ag layer for later use in fabricating an Aluminum or Magnesium based metal matrix composite. 27 micron diamond particles (Beta Diamond Products, Yorba Linda, Calif.) were coated by $AgNO_3$ decomposition employing several variations on the process. First, a 10 w % mixture of finely powdered $AgNO_3$ and diamond power was prepared and heated above the liquefaction temperature (222° C.) of the $AgNO_3$ while stirring. The temperature then was elevated to the $AgNO_3$ decomposition temperature. Typical particles had small globules of Ag attached with an apparently insufficient quantity of the latter for coating.

Higher fractions of Ag were attempted using water and ethylene glycol based solutions of $AgNO_3$. In these cases, the $AgNO_3$ solution was evaporated at moderate temperature (~80° C.) while stirring and subsequently transferred to a furnace to decompose the $AgNO_3$. The best coverage of Ag was obtained with about 50 weight percent Ag from a glycol best solution. This appeared to be about a 50 percent coverage of the particles. Addition of further $AgNO_3$ did not appear to produce a 100 percent coating.

Since the Ag coating was still quite imperfect, it was speculated that evolution of $CO_2$ from the diamond particles during wetting. To test this, a sample of $AgNO_3$ covered diamond particles was heated in a glove box having an helium atmosphere. The result was unchanged, indicating gas evolution not to be the cause. The most probable cause of the incomplete coating, therefore, is the very smooth nature of the particle surfaces. The $AgNO_3$ process depends upon an abundance of nucleation sites to achieve uniformity. Further pursuit of this approach might include some sort of etching of the diamond particles to increase their roughness and provide the necessary sites.

EXAMPLE 2

Composite disk of diamond particles and silver metal

In this approach, a thin composite disk of diamond particulate and pure Ag was fabricated. This was done by cold pressing a quantity of the partially coated diamond powder described in example 1. A powder which had been coated to a weight fraction of 50% Ag was pressed to 1500 psi in a 1.25" diameter die. The disk produced was about 0.040–0.060" thick and weighed 3.15 g. The disk was soaked in liquid $AgNO_3$ at about 250° C. which it immediately absorbed into its pores. The disk was transferred to a furnace held at about 500° C. for several minutes to decompose the $AgNO_3$ as described in the references cited. The procedure was repeated 4 times noting the weight increase after each decomposition. Very slight increase in the final weight of 3.9 g was observed after the fourth decomposition.

A simple apparatus to obtain rough comparison thermal transport measurements was designed. This consisted of an insulating foam container, a small pedestal heater, a thermocouple, a regulated d.c. power supply and a d.c. millivolt strip chart recorder.

In each case, a piece of commercial aluminum (6061) was cut to the same dimensions (length and cross section) as the composite sample to be tested. The former was used as comparison standard, since it is a commonly used heat sink material. Its thermal conductivity, as noted above, is about 2.37 W.cm/K. Within the foam box, one end of the sample to be tested was glued to the heater face, while the thermocouple was glued carefully to the opposite end. The thermocouple was connected to the recorder, which was set on a sensitive (millivolt) vertical scale. The foam container was closed to provide thermal isolation.

The chart recorder was set on a suitable time base. This was energized, followed by the power supply. The point was noted on the chart paper when the constant power began to be applied to the heater The time as indicated in divisions along the x axis of the paper. The pen indicated the sample temperature at the thermocouple on the y axis. One might have been inclined to use the apparatus to measure the time required for a given temperature to be attained. This observation, however, depends upon the thermal capacity (specific heat) of the individual sample which is different for each. Instead, the time at which a perceptible rise occurred in temperature at the thermocouple end of the same was measured This gives a much clearer indication when the heat front first reaches the opposite edge of the sample. The same procedure was followed for both samples and comparison made.

The composite disk had been broken by previous attempts to cut a strip. A piece about $\frac{5}{8}''$ long and $\frac{1}{2}''$ wide remained for the measurement. While this geometry is not ideal for the measurement described, it was carried out successfully. An aluminum control was prepared and measured, followed by the portion of pressed composite. About 12 divisions on the time axis were required for initial temperature rise of the control, while 9 were required by the composite, respectively. This ratio provides a rough measure of the conductivity by comparison as follows: $(12/9)\times 2.37$ W/cm/K$=3.16$ W/cm/K.

It might be useful to note that direct computation of constituent volumes indicated that the composite had about 18% porosity This could be eliminated by pressure consolidation during decomposition, or some other method. This, in turn, would improve the thermal conductivity.

The cold pressed Ag/diamond particulate composite can be produced to virtually any required shape by isostatic pressing or hot isostatic pressing ("hip"ing). Subsequent filling of the residual porosity by $AgNO_3$ infiltration does not significantly change the dimensions. The fraction of diamond particulate may be increased, since only a 10–15 weight percent Ag coating on the diamond particles appears to be sufficient to produce the original pressing. The infiltrated Ag would provide the necessary strength Subsequent workability of the Ag/diamond composite, for example ability to drill holes in same, would have to be determined.

EXAMPLE 3

Diamond particulate/silver/aluminum laminate

In the final approach, a diamond particulate/Ag-/aluminum laminate was produced. A 1" wide 6" long high purity (99.99%) aluminum strip 0.005" thick was used. This was cleaned with acetone, dipped in molten $AgNO_3$ at 250° C. and heated to 500° C. for several minutes to provide an Ag coating. The coated aluminum strip weighed about 2.1 g. The strip was folded in half. A quantity of the coated powder described in example 2 was used. 6 of this powder was mixed with 3 g of finely ground $AgNO_3$. The powder was spread over half the foil by the doctor blade method and placed in a furnace at 500° C. to bond the particles to the al strip.

A small amount of additional powdered $AgNO_3$ was spread on the particle coated portion of the strip to promote bonding. The top half of the strip then was folded down to form a sandwich. This subsequently was placed between two dagged steel plates. Finally, the assembly was inserted into a vacuum hot press and subjected to a pressure of about 500 psi at 500° C. for 2 hours. The product was a bonded composite strip $4''\times 1''\times 0.040''$ weighing 10.8 g. A potential advantage of this fabrication is its increased toughness and ability to accept drilling and limited bending. This is accomplished with the penalty of a lower fraction of diamond particles in the composite.

While this compact contained perhaps only 20–30% diamond particles, their proportion might be increased by decreasing the quantity of Ag in the compact. Since the diamond particles are very hard and acicular, increasing the compaction pressure will facilitate disruption of the oxide layer present on the aluminum, allowing the Ag to readily bond by diffusion. Sufficient Ag must be present for bonding within the diamond particulate mass.

An aluminum control strip was cut to the same length and cross section as the composite laminate as was done for the compact of example 2. In this case the sample length was much more auspicious for the thermal conductivity measurement.

The aluminum control strip required about 27 time divisions for a perceptible temperature rise at the thermocouple, while the Al/diamond/Ag laminate required about 13 divisions. Again, using this ratio and the known value of thermal conductivity of the aluminum control, the approximate conductivity of the composite may be obtained. This is: $(27/13)\times 2.37$ W/cm/K$=4.92$ W/cm/K. This is a respectable value which obviously could be improved upon by varying the constituents.

Obviously, numerous other modifications and variations of the present invention are possible in light of the foregoing teachings It is therefore to be understood that within the scope of the appended claims the invention may be practiced otherwise than as specifically described.

What is claimed is:

1. A process for preparing a diamond particle/silver metal matrix composite material object comprising:

A. coating the surfaces of diamond powder particles with molten silver nitrate at a temperature of from just above the melting point of silver nitrate to just below the decomposition temperature of silver nitrate;

B. heating the molten silver nitrate coated diamond particles produced in step A at a temperature from the decomposition temperature of silver nitrate up to 550° C. until the molten silver nitrate decomposes to form a coating of silver metal on the surfaces of the diamond particles;

C. consolidating the silver metal coated particles produced in step B into a composite structure having continuous pores between the silver coated diamond particles;

D. infiltrating the continuous pores of the composite structure produced in step C with molten silver nitrate at a temperature of from just above the melting point of silver nitrate to just below the decomposition temperature of silver nitrate;

E. heating composite structure at a temperature of from the decomposition temperature of silver nitrate to 550° C. until the molten silver nitrate in the pores of the composite structure decomposes to silver metal; and F. repeating steps D and E until the pores of the composite structure are essentially filled with silver metal.

2. The process of claim 1 wherein in step A the surfaces of the diamond particles are coated with molten silver nitrate by (1) intimately mixing the diamond powder with silver nitrate powder;

(2) heating the diamond/silver nitrate powder mixture at a temperature of from just above the melting point of silver nitrate to just below the decomposition temperature of silver nitrate until the silver nitrate melts, and (3) agitating the diamond powder/molten silver nitrate mixture until the molten silver nitrate coats all the diamond particles.

3. The process of claim 1 wherein in step A the surfaces of the diamond particles are coated with molten silver nitrate by (1) mixing the diamond powder with a saturated solution of silver nitrate in a solvent that is water or ethylene glycol, (2) removing the solvent to form small crystals of silver nitrate on the surfaces of the diamond particles; and (3) heating the silver nitrate coated diamond particles to a temperature of from just above the melting point of silver nitrate to just below the decomposition temperature of silver nitrate until the silver nitrate melts to form the coating of molten silver nitrate on the surfaces of the diamond particles.

4. The process of claim 1 wherein in step B the molten silver nitrate coated particles are heated at a temperature of from 450° C. to 525° C. until the molten silver nitrate decomposes to form a coating of silver metal on the surfaces of the diamond particles.

5. The process of claim 4 wherein in step B the molten silver nitrate coated particles are heated at a temperature of from 475° C. to 500° C. until the molten silver nitrate decomposes to form a coating of silver metal on the surfaces of the diamond particles.

6. The process of claim 1 wherein in step E the composite structure is heated at a temperature of from 450° C. to 525° C. until the molten silver nitrate in the pores of the composite structure decompose to silver metal.

7. The process of claim 6 wherein in step E the composite structure is heated at a temperature of from 475° C. to 500° C. until the molten silver nitrate in the pores of the composite structure decompose to silver metal.

8. The process of claim 1 wherein the amount of silver nitrate and the amount of diamond powder are selected in step A to produce in step B silver metal coated diamond particles comprising from about 10 to about 60 weight percent silver metal with the remainder being diamond.

9. The process of claim 8 wherein the amount of silver nitrate and the amount of diamond powder are selected in step A to produce in step B silver metal coated diamond particles comprising from 15 to 50 weight percent of silver metal with the remainder being diamond.

10. The process of claim 9 wherein the amount of silver nitrate and the amount of diamond powder are selected in step A to produce in step B silver metal coated diamond particles comprising from 20 to 40 weight percent of silver metal with the remainder being diamond.

* * * * *